Patented Nov. 27, 1945

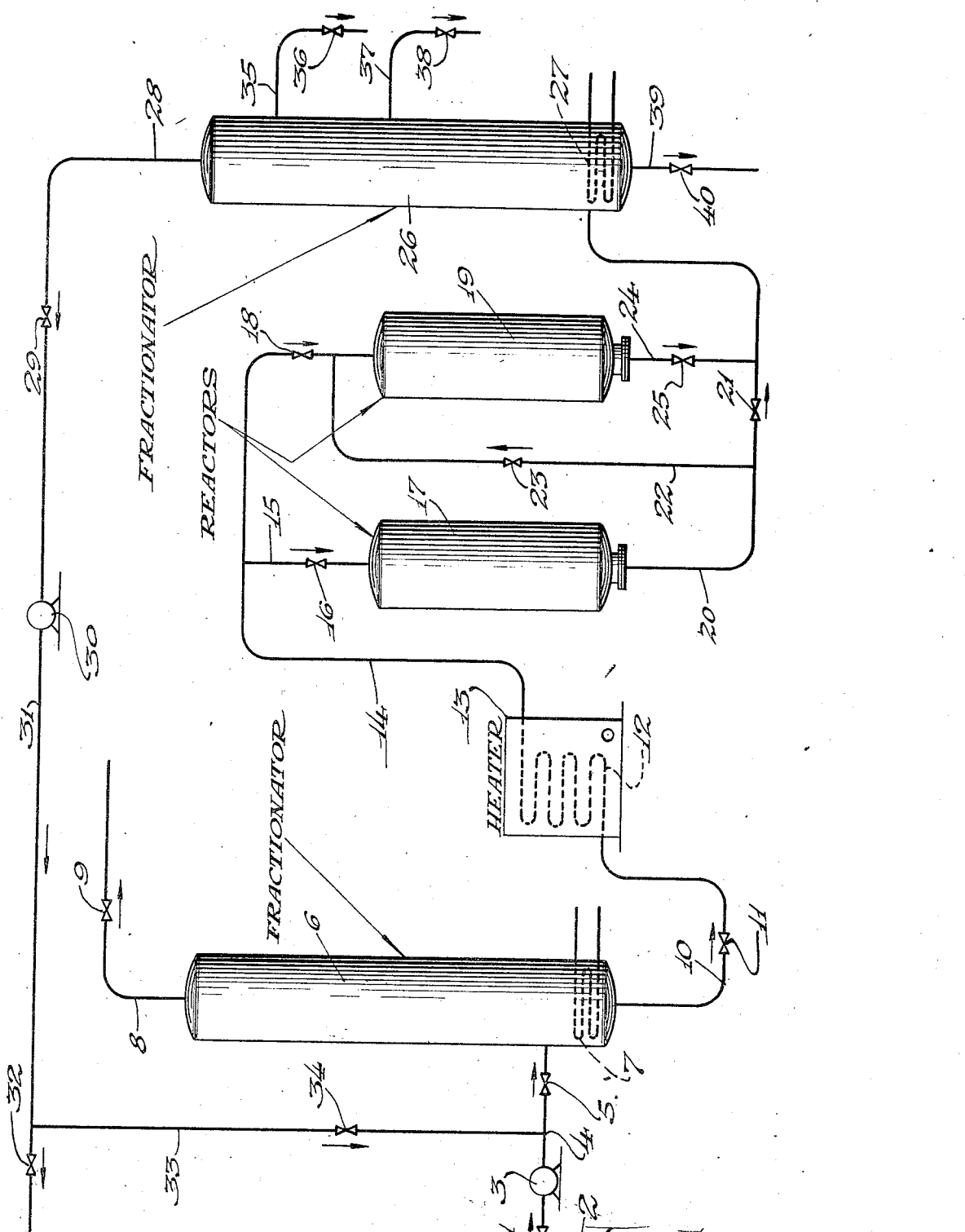

2,389,780

UNITED STATES PATENT OFFICE 2,389,780

CONVERSION OF ETHYLENE

Vladimir N. Ipatieff and Vladimir Haensel, Chicago, Ill., assignors to Universal Oil Products Company, Chicago, Ill., a corporation of Delaware Application June 22, 1942, Serial No. 447,958

9 Claims. (Cl. 260—683.15)

This invention relates to a process for converting ethylene into propylene, butylenes, and normally liquid hydrocarbons of gasoline boiling range. More specifically, the process is concerned with the treatment of ethylene or an ethane-ethylene fraction in the presence of a granular refractory catalytic material.

In one specific embodiment, the present invention comprises a process for treating ethylene or an ethane-ethylene fraction at a temperature of from about 250° to about 550° C. in the presence of a calcined composite catalyst comprising silica and zinc and at least one oxide from the group consisting of aluminum oxide and zirconium oxide.

Substantially pure ethylene is obtainable by the catalytic dehydration of ethyl alcohol while hydrocarbon fractions comprising essentially ethylene and ethane may be separated from the gaseous products produced incidental to the cracking of normally liquid hydrocarbons to produce gasoline. Ethane-ethylene mixtures also result from the catalytic and thermal treatment of normally gaseous paraffins and particularly of ethane, propane, and butanes. Heretofore, the utilization of ethylene has not progressed as rapidly as utilization of higher olefins, probably because processes were not developed previously whereby ethylene could be controllably converted into propylene and butylene as well as into normally liquid olefinic hydrocarbons. The present invention is concerned particularly with a process in which the conditions of operation are controlled to produce normal butylenes which themselves are readily polymerizable either thermally or catalytically or which may be converted into butadiene by catalytic dehydrogenation or by chemical means.

Catalysts utilizable in the present process are formed by compositing a solid polymerizing catalyst comprising essentially an association of oxides of silicon, aluminum, and zirconium with zinc and/or zinc oxide. A catalyst component comprising an association of aluminum oxide and silicon oxide may consist of a synthetically prepared silica-alumina mixture or a certain raw or acid-treated clay. Preferred silica-containing catalyst components such as silica-alumina, silica-alumina-zirconia, silica-zirconia, and other so-called silica base catalysts may be prepared by a number of alternative methods including the simultaneous or successive precipitation of hydrogels of silica and alumina followed by washing, drying, and calcination treatments. Catalysts are also formed by compositing hydrogels of silica, alumina, zirconia, and/or thoria with zinc and/or zinc oxide. Catalysts utilizable in the present process are preferably calcined by heating in air at an elevated temperature prior to being introduced to the reaction zone in which ethylene is converted into propylene, butylene, and higher molecular weight hydrocarbons. Although the nature of the catalyst is not understood completely, the calcination treatment may activate the silica-containing composite and also convert a portion of the zinc into zinc oxide which apparently has a beneficial influence on ethylene conversion reactions as herein described.

The process of the present invention is preferably carried out in a continuous manner to control the reaction so as to obtain not only normally liquid polymers but also substantial yields of propylene and butylene. In carrying out this process, ethylene or a mixture such as one comprising essentially ethane, ethylene, methane, and hydrogen is compressed to a pressure of from about 300 to about 1500 pounds per square inch and passed through a preheating zone, after which the heated gas is directed through a reactor containing granular catalyst as herein described. The reactor containing the catalyst through which the ethylene is passed is maintained at a temperature of from about 250° to about 550° C. The catalyst employed in the process makes the catalytic surface very large in comparison with the surface of the walls of the reactor. The preferred size of the catalyst particles depends upon the type of operation to be carried out, that is, whether the catalyst is utilized in the form of a fixed bed, as above referred to, or whether it is employed as fine powder which is utilizable either as a slurry or in a type of treatment generally referred to as fluid type operation. When utilizing a fixed bed of catalyst in laboratory size equipment, it is generally preferable to employ catalyst particles of about 8 to 14 mesh size in order to obtain good contact between the reaction mixture and the catalyst.

The reaction product obtained in the present process is fractionally distilled and separated into a mixture of unreacted ethylene and ethane, a mixture of hydrogen and methane, the latter materials being either present in the charging stock or formed during the process, and a fraction comprising essentially propylene, butylenes, and higher boiling hydrocarbons. The ethane-ethylene fraction is suitably recycled to the reaction zone and the mixture of propylene, butylenes, and higher boiling hydrocarbons is further distilled into a fraction comprising essentially propane and propylene, a mixture of butanes and butylenes, a normally liquid hydrocarbon fraction of gasoline boiling range, and a residue comprising essentially a mixture of higher boiling hydrocarbons.

The present process of treating ethylene or an ethane-ethylene mixture in the presence of a catalyst as herein described has several advantages over the thermal treatment of ethylene or of an ethane-ethylene fraction in the absence of a catalyst. By the use of the present process, formation of carbon or a hydrocarbonaceous deposit within the reactor is kept low in contrast to the results obtained when employing a reactor containing no catalyst or one containing an association of aluminum oxide, silicon oxide, and zirconium oxide without the addition of zinc and/or zinc oxide as herein set forth. The product formed in the present process is substantially olefinic in character and contains considerable proportions of higher gaseous olefins, namely propylene and butylenes with particularly large amounts of normal butylenes.

By varying the operating conditions and preferably by lowering the pressure, the ratio of normally gaseous olefins to normally liquid olefins may be increased considerably. The catalyst used in the fixed bed type of operation provides for a rapid distribution of heat and also makes a high ratio of the filler surface to the metal wall surface of the reactor. The presence of a large surface of catalyst within the reactor in comparison with the relatively small surface of the metal walls make it possible to eliminate to a very large extent the undesired dehydrogenation and hydrogenation reactions, which in the absence of the catalyst would tend to convert a substantial proportion of the ethylene into normally gaseous paraffins, some of higher molecular weight than ethylene. Thus, it is possible in the presence of the catalyst to obtain substantial yields of higher molecular weight normally gaseous olefins including propylene and butylenes, the latter comprising both isobutylene and normal butylenes. Propylene, butylene, and normally liquid products resulting from the catalytic treatment of ethylene or an ethane-ethylene fraction may be separated from the unconverted ethylene-containing gas and the latter may be recycled to further conversion in the presence of the composite catalyst as hereinbefore set forth.

Further features and advantages of the present invention will be evident from consideration of the following description of one characteristic operation of the process illustrated by the flow shown in the attached diagrammatic drawing.

Referring to the drawing, a hydrocarbon fraction comprising essentially ethylene or ethylene and ethane and small amounts of methane and hydrogen which were not removed due to limitations of previously employed fractionation equipment, is directed through line 1 and valve 2 to compressor 3 which discharges through line 4 and valve 5 into fractionator 6 provided with reboiler coil 7 and of conventional design in which light gases such as hydrogen and methane are separated from hydrocarbons containing 2 carbon atoms per molecule. Alternatively this separation may be effected in absorption and stripping equipment not illustrated in the diagrammatic drawing. The light gases are discharged from fractionator 6 through line 8 and valve 9, and a fraction comprising essentially ethane and ethylene or ethylene is directed through line 10 and valve 11 to coil 12 in heater 13 and thence through lines 14 and 15 and valve 16 to reactor 17 containing catalyst as hereinbefore set forth. The heated ethane-ethylene fraction may also be directed from line 14 through valve 18 to a second reactor 19 also containing catalyst. Although only two reactors are shown in the drawing, more than two may be employed either in parallel or in series as desired. Reactors 17 and 19 may be utilized in series by conducting the reaction mixture from reactor 17 through lines 20 and 22 and valve 23 to line 14 beyond valve 18 and thence to reactor 19. In order to effect this type of operation, valves 18 and 21 are kept closed. The resultant reaction mixture is directed from reactor 19 through line 24, valve 25, and line 20 to fractionator 26. In case reactors 17 and 19 are to be operated in parallel, valve 23 is closed. The reaction products being discharged from reactors 17 and 19 are directed to fractionator 26 of suitable design for separating said products into a mixture of light gases comprising essentially hydrogen, methane, ethane, and ethylene, a $C_3$–$C_4$ hydrocarbon fraction containing substantial proportions of propylene and butylenes, a normally liquid hydrocarbon fraction of gasoline boiling range, and a higher boiling mixture of liquid hydrocarbons which may be referred to by the term residue. Fractionator 26 which is shown as equipped with reboiler coil 27 may also consist of more than one fractionating column as may be necessary to effect the desired separation.

The mixture of light gases comprising essentially hydrogen, methane, ethane, and ethylene is directed from the top of fractionator 26 through line 28 containing valve 29 to compressor 30 which discharges through line 31 containing valve 32. While a portion of this mixture may be discharged through valve 32, a substantial proportion thereof is directed from line 31 through recycle line 33 and valve 34 to line 4 already mentioned and through which the charged ethane-ethylene fraction is introduced to fractionator 6, already mentioned. The $C_3$–$C_4$ hydrocarbon fraction formed in the process and containing a high proportion of olefinic hydrocarbons is discharged from fractionator 26 through line 35 and valve 36 to cooling and storage, not illustrated in the drawing. Normally liquid hydrocarbons of gasoline boiling range are directed from fractionator 26 through line 37 and valve 38 to cooling and storage. Hydrocarbon material boiling higher than gasoline and generally referred to as residue is withdrawn from the bottom of fractionator 26 through line 39 and valve 40.

In carrying out the present process the heated ethane-ethylene mixture may be passed through one reactor until small amounts of carbon or hydrocarbonaceous material deposit upon the catalyst and then the reaction mixture may be directed to the other reactor while the carbonaceous deposit is burned from the catalyst in the first named reactor. In this way, each catalytic reactor is used alternatively and each processing period is followed by a period of catalyst reactivation. The attached drawing does not illustrate the additional equipment necessary for effecting such catalyst reactivations.

The following example is introduced as characteristic of the results obtained in the present process, although these data are presented with no intention of thereby limiting the generally broad scope of the invention.

In each of runs 1 and 2 shown in the following table, ethylene was charged to a steel reactor containing respectively, (1) a composite of silica, alumina, and zirconia and (2) a composite of silica, alumina, zirconia, and zinc dust which had been calcined in air for one hour at 400° C. during which time some zinc oxide was formed in the composite. The silica-alumina-zirconia composite consisted of about 100 molecular proportions of silicon oxide, two molecular proportions of aluminum oxide, and four molecular proportions of zirconium oxide. For use in run 2, 48% by weight of the powdered silica, alumina, and zirconia composite and 48% of zinc dust were intimately mixed with 4% of powdered rosin, after which the mixed powder was formed into 3 x 3 mm. cylindrical pellets by means of a pilling machine. These pellets were then calcined in air as above indicated and utilized as reactor filling material. The silica-alumina-zirconia composite employed as reactor filling material in run 1 was similarly pelleted and calcined before use.

TABLE

*Catalytic treatment of ethylene.*

| Reactor filling material | Run No. 1 Composite of silica, alumina, and zirconia | Run No. 2 Calcined composite formed from silica-alumina-zirconia and zinc dust |
|---|---|---|
| Operating conditions: | | |
| Temperature, °C | 325 | 325 |
| Pressure, lbs./sq. in | 1,000 | 1,000 |
| Time, hours | 2.7 | 2.5 |
| Products per pass, per cent by weight of ethylene charged: | | |
| Liquid hydrocarbons | 28.5 | 25.0 |
| Condensible gas | 11.5 | 16.2 |
| Noncondensible gas | 60.0 | 58.8 |
| Analysis of condensible gas, mole per cent: | | |
| Propylene | 8.7 | 0.7 |
| Propane | 2.8 | 1.0 |
| Butylenes | 38.5 | 90.1 |
| Butanes | 50.0 | 8.2 |
| Analysis of noncondensible gas, mole per cent: | | |
| Ethylene | 93.2 | 94.5 |
| Hydrogen | 0.8 | 1.4 |
| Paraffins | 6.0 | 4.1 |
| Paraffin index[1] | 2.4 | 2.0 |
| Total condensible gaseous and liquid products formed per pass, per cent by weight of ethylene charged | 40.0 | 41.2 |
| Butylenes in total products, weight per cent | 11.2 | 35.5 |
| Ultimate conversion to butylenes, per cent by weight of ethylene reacted | 10.0 | 33.3 |
| Ultimate conversion to normally liquid hydrocarbons | 64.0 | 56.9 |

[1] Average number of carbon atoms per molecule.

The above indicated results show that butylene formation was increased by the use, as catalyst, of the calcined composite of silica, alumina, zirconia, and zinc dust. Furthermore, there was less formation of propane and lower boiling paraffin gases in the presence of this preferred catalyst than in the presence of the silica-alumina-zirconia composite.

The liquid product formed in the presence of the catalyst of the present invention comprises essentially mono-olefinic hydrocarbons including those containing from 5 to 12 and more carbon atoms per molecule. Of the liquid product, 75% by volume boiled below 150° C. and a total of about 95% by volume boiled below about 220° C. and had an octane number of 80.

The foregoing specification and example indicate the character and value of the present invention, although it is not intended that either section should unduly limit the generally broad scope of the invention.

We claim as our invention:

1. A process for converting ethylene into substantial yields of butylene which comprises reacting ethylene in the presence of a calcined composite catalyst comprising silica metallic zinc, alumina and zirconia.

2. A process for producing substantial yields of butylenes and gasoline which comprises subjecting ethylene to a temperature of from about 250° to about 550° C. under a pressure of from about 300 to about 1500 pounds per square inch in the presence of a solid granular composite comprising essentially silica, metallic zinc, zinc oxide, alumina and zirconia.

3. A process for producing substantial yields of butylenes and gasoline which comprises subjecting an ethane-ethylene fraction to a temperature of from about 250° to about 550° C. under a pressure of from about 300 to about 1500 pounds per square inch in the presence of a solid granular composite comprising essentially silica, metallic zinc, zinc oxide, alumina and zirconia.

4. A process for producing substantial yields of butylenes and gasoline which comprises subjecting ethylene to a temperature of from about 250° to about 550° C. in the presence of a solid granular composite comprising essentially silica, alumina, zirconia, zinc oxide, and metallic zinc.

5. A process for producing substantial yields of butylenes and gasoline which comprises subjecting ethylene to a temperature of from about 250° to about 550° C. in the presence of a solid granular composite comprising essentially silica, alumina, zinc oxide, and metallic zinc.

6. A process for producing substantial yields of butylenes and gasoline which comprises subjecting ethylene to a temperature of from about 250° to about 550° C. in the presence of a solid granular composite comprising essentially silica, zirconia, zinc oxide, and metallic zinc.

7. A process for producing substantial yields of butylenes and gasoline which comprises subjecting an ethane-ethylene fraction to a temperature of from about 250° to about 550° C. in the presence of a solid granular composite comprising essentially silica, alumina, zirconia, zinc oxide, and metallic zinc.

8. A process for producing substantial yields of butylenes and gasoline which comprises subjecting an ethane-ethylene fraction to a temperature of from about 250° to about 550° C. in the presence of a solid granular composite comprising essentially silica, alumina, zinc oxide, and metallic zinc.

9. A process for producing substantial yields of butylenes and gasoline which comprises subjecting an ethane-ethylene fraction to a temperature of from about 250° to about 550° C. in the presence of a solid granular composite comprising essentially silica, zirconia, zinc oxide, and metallic zinc.

VLADIMIR N. IPATIEFF.
VLADIMIR HAENSEL.